(12) United States Patent
Liedtke et al.

(10) Patent No.: US 6,523,097 B1
(45) Date of Patent: Feb. 18, 2003

(54) UNVALUE-TAGGED MEMORY WITHOUT ADDITIONAL BITS

(75) Inventors: Jochen Liedtke, Bruchsal-Obergrombach (DE); Marc Alan Auslander, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 09/613,697

(22) Filed: Jul. 11, 2000

Related U.S. Application Data

(60) Provisional application No. 60/165,040, filed on Nov. 12, 1999.

(51) Int. Cl.⁷ .............................................. G06F 12/00
(52) U.S. Cl. ....................................... 711/154; 711/153
(58) Field of Search ................................ 711/154, 153, 711/118; 708/250, 251, 252, 253, 254, 255, 525; 712/244

(56) References Cited

U.S. PATENT DOCUMENTS

| | | | | |
|---|---|---|---|---|
| 4,920,477 A | * | 4/1990 | Colwell et al. ............. | 711/207 |
| 5,448,705 A | * | 9/1995 | Nguyen et al. ............. | 712/228 |
| 5,481,685 A | * | 1/1996 | Nguyen et al. ............. | 712/228 |
| 5,875,465 A | * | 2/1999 | Kilpatrick et al. .......... | 711/123 |
| 6,088,783 A | * | 7/2000 | Morton ....................... | 712/203 |

FOREIGN PATENT DOCUMENTS

JP 402091742 A * 3/1990 ........... G06F/12/08

OTHER PUBLICATIONS

Colwell et al., "A VLIW Architecture for a Trace Scheduling Complier," IEEE, vol. 37, No. 8, pp 967–979, Aug. 1988.*
August et al., "Integrated Predicated and Speculative Execution in the IMPACT EPIC Architecture," IEEE, The 25th Annual Intl Symposium on Computer Architecture, pp 227–237, Jul. 1998.*
Liedtke et al., "Implementing Unvalue–Tagged Memory Without Additional Bits," IBM T.J. Watson Research Center, pp 1–7, Aug. 17, 1999.*

* cited by examiner

*Primary Examiner*—Matthew Kim
*Assistant Examiner*—Stephen Elmore
(74) *Attorney, Agent, or Firm*—F. Chau & Associates, LLP

(57) ABSTRACT

There is provided a method for representing unvalues in an unvalue-unaware memory of a computer processing system. The method includes the step of selecting arbitrary bit combinations to represent the unvalues, upon startup of the system. Upon performing a read operation from the memory, a read value is interpreted as an unvalue, when the read value matches at least one of the bit combinations. Upon performing a write operation to the memory, a value-unvalue-collision exception is raised, when a valid value is written to the memory and the valid value matches at least one of the bit combinations.

49 Claims, 11 Drawing Sheets

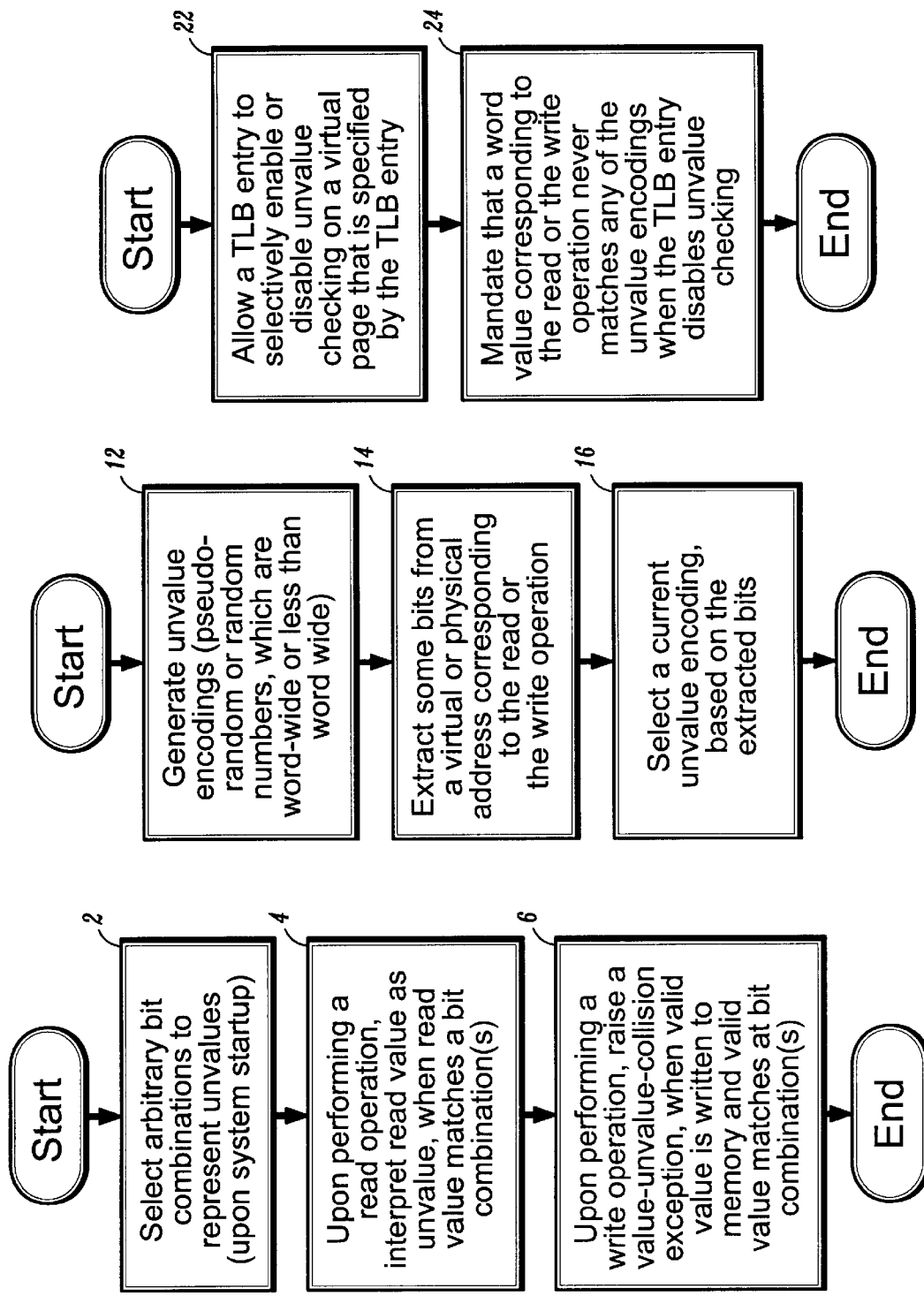

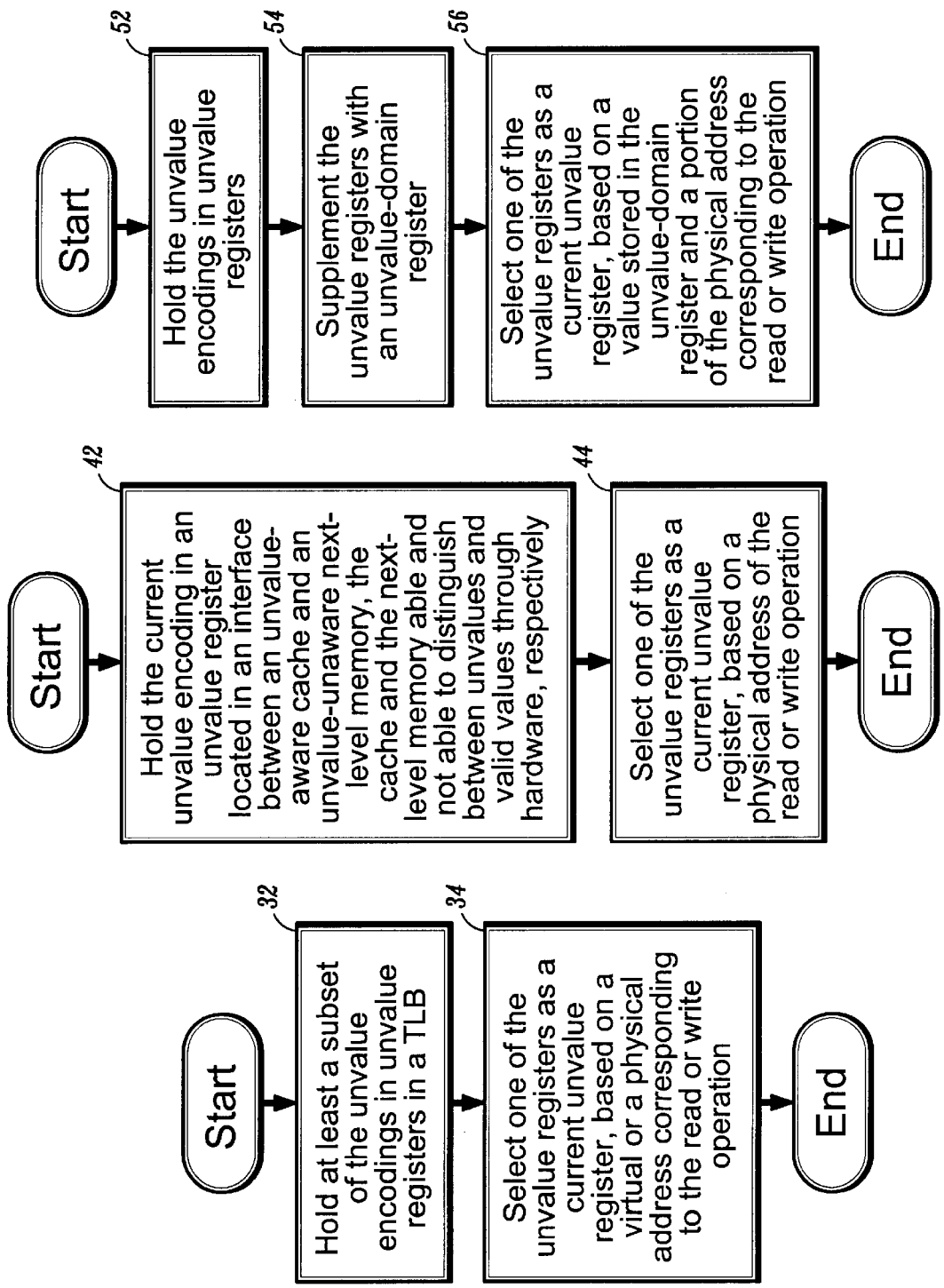

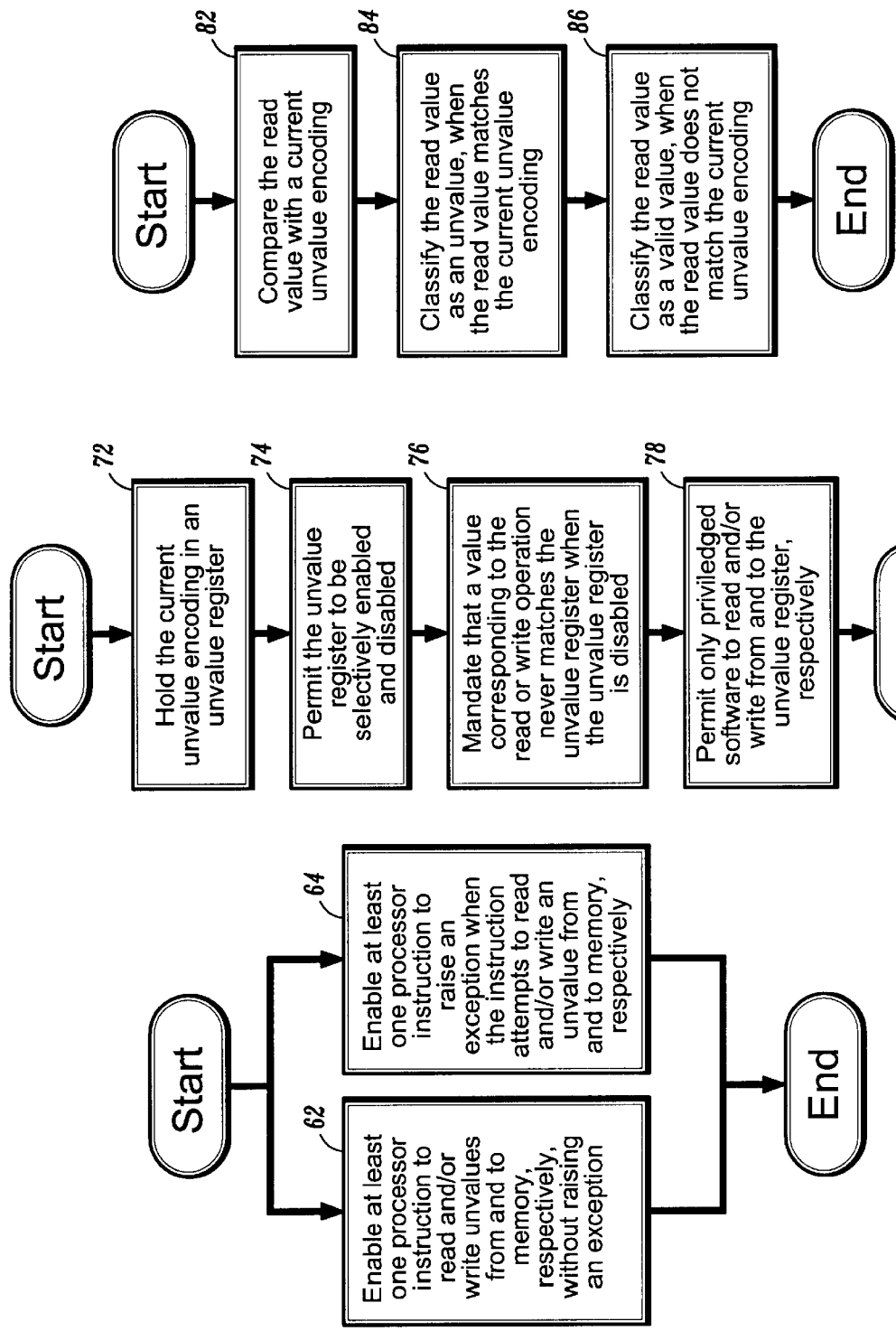

US 6,523,097 B1

UNVALUE-TAGGED MEMORY WITHOUT ADDITIONAL BITS

This is a non-provisional application claiming the benefit of provisional application Ser. No. 60/165,040, filed on Nov. 12, 1999, the disclosure of which is incorporated by reference herein.

BACKGROUND

1. Technical Field

The present invention relates generally to memory in computer processing systems and, in particular, to a method for representing unvalues in the memory of a computer processing system, without requiring additional bits.

2. Background Description

Unvalues are no values. No legal computations can be performed with unvalues. Operations on unvalues typically either raise an exception or result again in unvalues. Unvalues are generally used for detecting the use of uninitialized variables. Moreover, unvalues may be used for propagating invalid computational results such as overflows, and for detecting illegal uses of such invalid results. Further, unvalues may be used for deferring exceptions, particularly when data is accessed speculatively, such as, for example, in the Multiflow Computer and in the Impact Epic architecture.

Conventional methods for representing unvalues in a computer processing system require special hardware in the computer processing system such as value bits or tag bits to differentiate between unvalues and valid values. Such conventional methods have thus increased the complexity and cost associated with implementing unvalues in computer processing systems.

Accordingly, it would be desirable and highly advantageous to have a method for implementing unvalues which is less complex and costly than the prior art methods for accomplishing the same.

SUMMARY OF THE INVENTION

The problems stated above, as well as other related problems of the prior art, are solved by the present invention, a method for representing unvalues in the memory of a computer processing system. The method of the invention represents such values without adding bits to the computer processing system.

In a first aspect of the invention, there is provided a method for representing unvalues in an unvalue-unaware memory of a computer processing system. The method includes the step of selecting arbitrary bit combinations to represent the unvalues, upon startup of the system. Upon performing a read operation from the memory, a read value is interpreted as an unvalue, when the read value matches at least one of the bit combinations. Upon performing a write operation to the memory, a value-unvalue-collision exception is raised, when a valid value is written to the memory and the valid value matches at least one of the bit combinations.

In a second aspect of the invention, the selecting step further includes the step of generating a plurality of unvalue encodings. The method further includes the step of, for either one of the read operation and the write operation, selecting one of the plurality of unvalue encodings as a current unvalue encoding.

In a third aspect of the invention, the step of selecting the current unvalue encoding for the read operation includes the step of extracting some bits from one of a virtual address and a physical address corresponding to the read operation. The current unvalue encoding is selected, based on the extracted bits.

In a fourth aspect of the invention, the step of selecting the current unvalue encoding for the write operation includes the step of extracting some bits from one of a virtual address and a physical address corresponding to the write operation. The current unvalue encoding is selected, based on the extracted bits.

In a fifth aspect of the invention, the plurality of unvalue encodings are one of pseudo-random numbers and random numbers.

In a sixth aspect of the invention, each of the plurality of unvalue encodings are word-wide, and the method further includes the step of classifying a word value as matching the current unvalue encoding, when the word value is equal to the current unvalue encoding, the word value being one of read and to be written.

In a seventh aspect of the invention, each of the plurality of unvalue encodings include less bits than a predetermined word-size of the memory. The method further includes the step of classifying a word value as matching the current unvalue encoding, when a Boolean function applied to the word value and the current unvalue encoding evaluates to true, the word value being one of read and to be written.

In an eighth aspect of the invention, the function evaluates to true for a single word value, when the function is applied to any of the plurality of unvalue encodings.

In a ninth aspect of the invention, the function evaluates to true for a plurality of word values, when the function is applied to any of the plurality of unvalue encodings.

In a tenth aspect of the invention, the method further includes the step of allowing a given TLB entry in a translation lookaside buffer (TLB) of the computer processing system to selectively enable or disable unvalue checking on a virtual page that is specified by the given TLB entry. A word value corresponding to one of the read operation and the write operation never matches any of the plurality of unvalue encodings when the given TLB entry disables the unvalue checking.

In an eleventh aspect of the invention, the method further includes the step of enabling at least one processor instruction to at least one of read and write the unvalues from and to the memory, respectively, without raising a corresponding exception.

In a twelfth aspect of the invention, the method further includes the step of enabling at least one processor instruction to raise an exception when the at least one processor instruction attempts to at least one of read and write a given unvalue from and to the memory, respectively.

In a thirteenth aspect of the invention, the method further includes the step of holding the current unvalue encoding in an unvalue register of a processor of the computer processing system.

In a fourteenth aspect of the invention, the method further includes the step of holding at least a subset of the plurality of unvalue encodings in unvalue registers included in a translation lookaside buffer (TLB) of the computer processing system. One of the plurality of unvalue registers is selected as a current unvalue register, based on a virtual address corresponding to one of the read operation and the write operation.

In a fifteenth aspect of the invention, the method further includes the step of holding at least a subset of the plurality of unvalue encodings in a plurality of unvalue registers included in a processor of the system. One of the plurality of unvalue registers is selected as a current unvalue register, based on a physical address corresponding to one of the read operation and the write operation.

In a sixteenth aspect of the invention, the method further includes the step of holding the current unvalue encoding in an unvalue register located in an interface between an unvalue-aware cache and an unvalue-unaware next-level memory. The cache has hardware means adapted to differentiate between the unvalues and valid values. The next-level memory has an absence of the hardware means.

In a seventh aspect of the invention, the method further includes the step of holding the plurality of unvalue encodings in a plurality of unvalue registers located in an interface between an unvalue-aware cache and an unvalue-unaware next-level memory. The cache has hardware means adapted to differentiate between the unvalues and valid values. The next-level memory has an absence of the hardware means. One of the plurality of unvalue registers is selected as the current unvalue register, based on a physical address corresponding to one of the read operation and the write operation.

In an eighteenth aspect of the invention, the method further includes the step of holding the plurality of unvalue encodings in a plurality of unvalue registers. The plurality of unvalue registers are supplemented with an unvalue-domain register. A current unvalue register is selected from the plurality of unvalue registers, based on at least one of a value stored in the unvalue-domain register and a portion of a physical address. The physical address corresponds to one of the read operation and the write operation.

In a nineteenth aspect of the invention, the plurality of unvalue registers and the unvalue-domain register are located in at least one of a processor and an interface of the system. The interface is disposed between an unvalue-aware cache and an unvalue-unaware next-level memory. The cache has hardware means adapted to differentiate between the unvalues and valid values. The next-level memory has an absence of the hardware means.

In a twentieth aspect of the invention, the method further includes the step of permitting the unvalue register to be selectively enabled and disabled. A value corresponding to one of the read operation and the write operation never matches the unvalue register when the unvalue register is disabled.

These and other aspects, features and advantages of the present invention will become apparent from the following detailed description of preferred embodiments, which is to be read in connection with the accompanying drawings.

BRIEF DESCRIPTION OF THE DRAWINGS

FIG. 7 is a flow chart illustrating a method for representing unvalues in an unvalue-unaware memory of a computer processing system, according to an illustrative embodiment of the invention;

FIG. 8 is a flow chart further illustrating step 2 of FIG. 7, according to an illustrative embodiment of the invention;

FIG. 9 is a flow chart illustrating an optimization of the method of FIG. 7 with respect to a translation lookaside buffer, according to an illustrative embodiment of the present invention;

FIG. 10 is a flow chart illustrating the selection of an unvalue, according to an illustrative embodiment of the invention;

FIG. 11 is a flow chart illustrating the selection of an unvalue, according to another illustrative embodiment of the invention;

FIG. 12 is a flow chart illustrating the selection of an unvalue, according to yet another illustrative embodiment of the invention;

FIG. 13 is a flow chart illustrating exception strategies for processor instructions, according to an illustrative embodiment of the invention;

FIG. 14 is a flow chart illustrating various optimizations of the method of FIG. 7, according to another illustrative embodiment of the invention;

FIG. 15 is a flow chart further illustrating step 4 of FIG. 7, according to an illustrative embodiment of the invention;

DETAILED DESCRIPTION OF PREFERRED EMBODIMENTS

Figure 1:
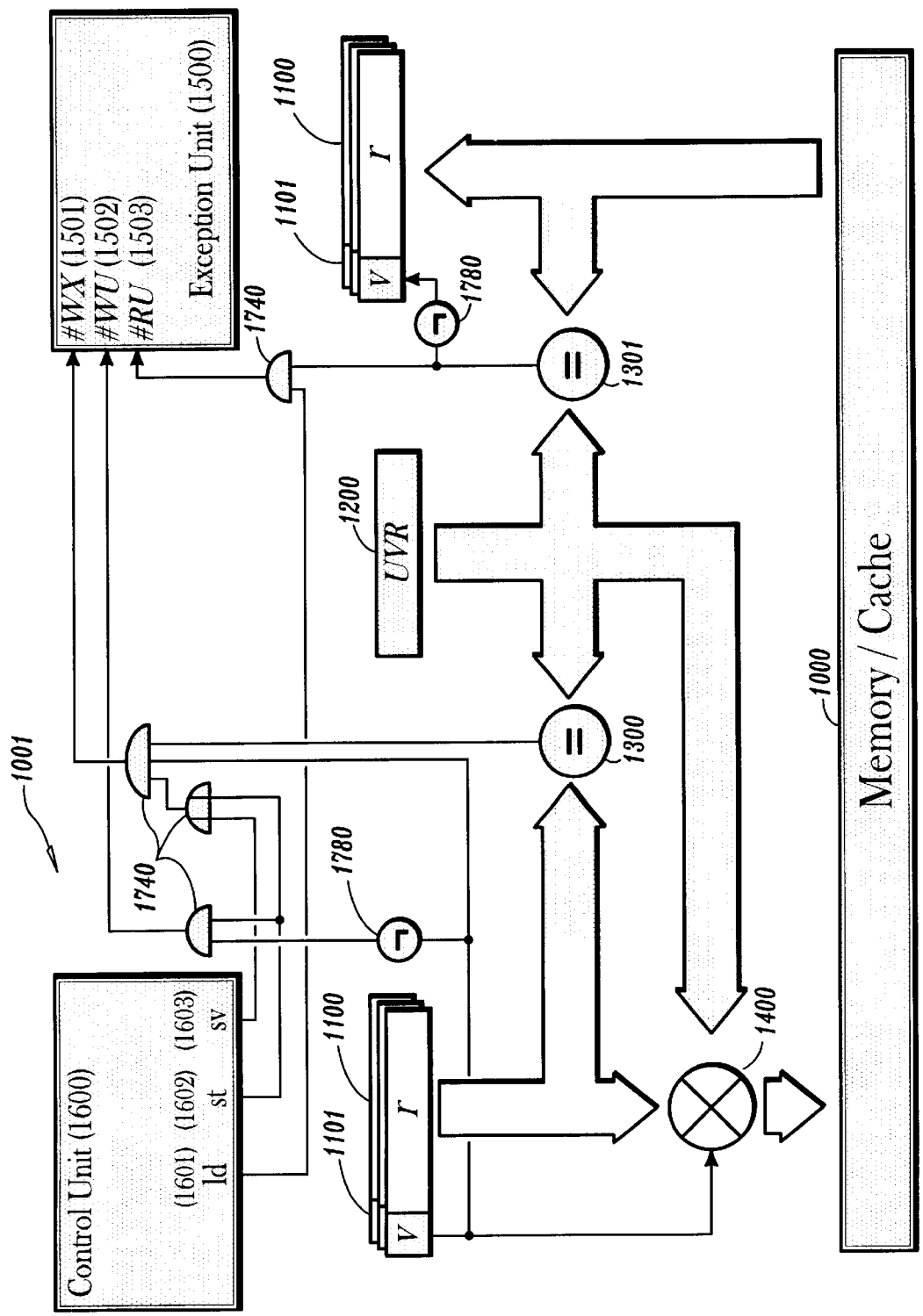
FIG. 1 is a diagram illustrating a processor/memory system 1001, according to an illustrative embodiment of the present invention.

The present invention is directed to a method for representing unvalues in the memory of a computer processing system. The method allows for the implementation of general unvalues (for 32-bit or 64-bit words) in the memory without adding additional bits per word. That is, the method of the invention advantageously allows for the implementation of general unvalues without requiring any special hardware means such as value bits or tag bits to differentiate between unvalues and valid values.

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A brief description of unvalues and their uses will now be given to introduce the reader to the concepts of the invention. Subsequently, more detailed descriptions of various aspects of the invention will be provided with respect to the Figures.

For detecting uninitialized variables, a computer processing system initializes all variables upon creation with the unvalue. The reading of such a variable prior to writing a value into it raises an exception.

In computations, particularly in floating-point computations, it is often preferable to return an unvalue in the case of an underflow or overflow instead of raising an exception. Subsequent operations then propagate the unvalue until the program checks the result. According to the present invention, unvalues can be stored and read without raising an exception but the program can check whether a variable contains an unvalue or a valid value. A beneficial side effect of the approach of the invention is that speculative execution of arithmetic operations never raises an exception.

If an architecture executes code speculatively and/or reads-data from memory speculatively, exceptions must be deferred. One way of doing so is to use unvalues in the former case, as well as whenever a speculative read results in a memory-access exception such as a page fault or a translation lookaside buffer (TLB) miss. According to the present invention, registers holding such unvalues must be able to be saved and restored, but any non-speculative use of such a register must raise an appropriate exception.

A brief description of floating-point unvalues will now be given. For the floating-point data type, a well-known unvalue is known as a "NaN" (Not a Number, i.e. not a valid floating-point number). Since not all 32-bit or 64-bit combinations represent valid floating-point numbers, there are no problems encoding NaNs in memory and in the registers of the processor. The IEEE 754 and 854 standards define such special bit combinations for representing NaNs.

A brief description of pointer unvalues will now be given. Since a virtual address space is typically not used in its entirety, a never-mapped region in the virtual address space can be used to enable pointer unvalues. Accessing memory directly via such an unvalue pointer raises a page-fault exception that can be interpreted as an unvalue fault. However, this technique is not as "waterproof" as floating-point NaNs. For example, arithmetic operations on unvalue pointers are still valid and can transform the unvalue pointers to a legal (though incorrect) pointer value.

A brief description of general unvalues will now be given. General unvalues, particularly integer unvalues, cannot be implemented by reserved bit combinations because all possible bit combinations denote valid values. Therefore, tagged memories are an obvious and well-known solution. Memory words as well as registers are supplemented by an additional value bit per word (or register) that is reset for denoting an unvalue and set for any valid value. An equivalent implementation could use invalid bits, set for unvalue, reset for valid values.

The technique is well-suited for the register file of a processor. However, it has some problems if applied to memories. First, standard memories are 32 or 64 bits wide (plus ECC or parity which should, for obvious reasons, not be used for implementing unvalues) and not 33 or 65 bits. Second, disk blocks typically have sizes of $2^n$ 8-bit bytes and device I/O is based on 8-bit bytes. Writing or reading pages of $2^k$ 33-bit or 65-bit words is thus difficult. Third, efficiently sending tagged data through networks is problematic due to similar reasons. In sum, value bits are possible per register. However, value bits are not feasible per memory word.

One of the primary aspects of the present invention is the use of randomly selected bitmasks for stochastic encoding of unvalues in memory. Accordingly, a brief description of stochastic unvalue encoding will now be given.

For any data word read/write operation, the processor compares the data word's value with the current encoding of unvalue. A match on a read operation is considered as reading an unvalue. It is presumed that unvalues in the register file are implemented by per-register value bits. Writing an invalid register results in writing the current unvalue encoding. However, writing a valid value that happens to coincide with the current unvalue encoding raises an exception that permits the operating system to change the unvalue encoding. The corresponding hardware mechanisms are described in detail hereinbelow.

The changing of the unvalue encoding should occur very infrequently in 64-bit systems. In particular, it should occur about once every 292 years if random values are written with a rate of 1 GHz. Nonetheless, it will sometimes happen and when it does, the operating system has to select a new unvalue encoding and has to change all old unvalue encodings in memory to the new unvalue encoding. Methods illustrating how this can be done are described in detail hereinbelow.

A description of some of the fundamental mechanisms of the present invention will now be given. This description will include descriptions and/or discussions of memory-access instructions, an unvalue register (UVR), exceptions, whether general exceptions for reading an unvalue are necessary, byte access and other subword accesses, UVR-checking between cache and memory, and sensitive and insensitive memory regions (as defined herein).

A description of memory access instructions will now be given. When variables are loaded into registers or results stored from registers into variables, unvalues are typically illegal, i.e. the unvalues signal an error. Therefore, the usual ld/st operations are sensitive to unvalues and raise an exception whenever they detect an unvalue. However, when registers must be saved or restored (as well as in some other cases), unvalues must be propagated to/from memory. For this purpose, save/restore operations exist that propagate unvalues without raising exceptions.

Disregarding the problem of how to implement unvalues, the semantical differences between unvalue-sensitive and unvalue-propagating operations could be described as shown in Table 1.

TABLE 1

|  |  | valid source value | unvalue source |
|---|---|---|---|
| st | r, [m] | [m] := r | WU exception |
| ld | r, [m] | r := [m] | RU exception |
| save | r, [m] | [m] := r | [m] := unvalue |
| restore | r, [m] | r := [m] | r := unvalue |

Here, r denotes a register, and [m] denotes a memory location. WU and RU denote exceptions that are raised if the mentioned conditions occur. Herein, it is always presumed that unvalues in the processor's general register file are implemented by per-register value bits $v\_r$, and that memory words do not have such bits.

A description of an unvalue register (UVR) according to an illustrative embodiment of the present invention will now be given. An unvalue register (UVR) in the processor is probably the simplest approach for hardware that supports stochastic unvalue encoding. The operating system can write values into the UVR, but user-level software cannot access it directly. Every memory word access is checked against the UVR, as shown in Table 2.

TABLE 2

|  |  | [m] ≠ UVR | [m] = UVR |
|---|---|---|---|
| ld | r, [m] | r,v_r := [m],1 | RU exception |
| restore | r, [m] | r,v_r := [m],1 | v_r: = 0 |
|  |  | v_r = 1 |  |
|  |  | r ≠ UVR    r = UVR | v_r = 0 |
| st | r, [m] | [m] := r   WX exception | WU exception |
| save | r, [m] | [m] := r   WX exception | [m] := UVR |

RU and WU exceptions respectively signal that unvalues are read/written illegally. The WX exception signals that a valid value is written to memory that happens to coincide with the current value in the UVR, i.e. the current unvalue encoding.

Typically, the entire UVR mechanism including all exceptions can be enabled/disabled by a bit ue in the processor-status register.

A description of exceptions will now be given. Table 3 lists all exceptions that are related to unvalue handling. All listed exceptions require that the effective data address used by the excepting instruction be passed to the exception handler, e.g. as a parameter or in a special register.

TABLE 3

| General Exceptions | | |
|---|---|---|
| RU | ld | Reading an unvalue. |
| WU | st | Writing an unvalue. |
| WX | st, save | Writing a valid value that happens to match the current unvalue encoding. |
| Exceptions for Special Variants | | |
| SU | save | Saving an unvalue. |
| UD | save, restore | Invalid Operation. |

The WX exception is similar to a page-fault exception in that it is not related to a program error. Instead, the WX exception signals to the operating system that the program requires some operating system action to proceed with its execution. Consequently, WX is typically handled transparently with respect to user programs.

Indeed, WX exceptions can be delayed until the according memory transfer is either started (fault) or finished (trap). There is no need to relate a WX exception precisely to the instruction that caused it. However, WX exceptions must be consistent with other memory accesses. In particular, all of the adaption methods described hereinbelow permit such delayed WX exceptions.

WU and RU exceptions basically signal program errors (i.e. illegal use of variables) and are, thus, typically propagated to the faulting user-level program. From a debugging perspective, both exceptions can be implemented as traps, i.e. raised after the instruction had an effect. Faults (raised before the instruction has had an effect) are sometimes nicer but never really necessary. Since timing is less critical for traps and a software implementation of insensitive regions is simpler, it is preferable, but not necessary, to have both exceptions implemented as traps.

In contrast to WX, both exceptions (WU and RU) should be reported precisely. Otherwise, a debugger could report only the faulting variable, not precisely the faulting instruction/statement. Reporting WU precisely is not critical since it can be detected even before the memory unit becomes active.

Precise RU exceptions might be critical since some architectures like to retire a load instruction before the data transfer finishes. The timing problem might be solved by also having value bits in the cache. Otherwise, RU can be implemented unprecisely or RU exceptions could be dropped.

A brief discussion of the necessity of RU exceptions will now be given. In principal, RU exceptions are not necessary, provided that unvalues are propagated through all ALU operations and raise exceptions whenever the unvalues are used as an address, in a comparison, or in a store. Under the aforementioned conditions, RUs are somehow delayed, but they always eventually result in an exception before the read unvalue has an effect on memory or on program status. Note that the methods described hereinbelow work properly when RU is ignored and never raises an exception. However, even if an RU exception is not strictly required, it is preferably to have an RU exception, even an unprecise RU exception, because the RU exception permits better error analysis.

A description of byte access and other subword accesses will now be given. Many processors offer ldb/stb instructions that load bytes into registers or store registers into bytes. Similar operations typically exist for other subword data types, with and without sign extension. Furthermore, misaligned word accesses also result in subword accesses to memory. We use ldb/stb as synonyms for all those explicit and implicit subword operations. There is no principal difference between byte operations and other subword operations.

Depending on whether the processor internally reads the entire word or not, there are two variants for handling ldb operations. In the first variant, ldb is unvalue-insensitive, i.e. never raises an RU exception. In the second variant, ldb raises an RU exception if it reads part of a word that contains an unvalue, i.e. part of a word [m] such that [m]=UVR.

The stb operations are always unvalue-sensitive in the sense that they raise a WU exception if the corresponding register's value bit $v\_r$ is not set. A more serious problem is an stb that changes a memory word such that [m]=UVR holds afterwards. If the processor hardware permits detection of this situation, that is, basically if the processor hardware reads the entire word before changing the word, a WX exception has to be raised in this case. In such a case, the processor is subword-stable.

However, due to efficiency reasons, most processors are subword-unstable; thus, an stb operation never raises a WX exception. Methods for handling subword-unstable processors are described in detail hereinbelow.

A description of UVR-checking between cache and memory will now be given. It is easily possible to move the UVR-checking from the processor core's load/store unit to the memory interface of the cache. This makes UVR-checking less time critical and makes the system subword-stable, provided that ldb/stb operations always operate on cache lines (e.g. if the cache always uses the write-allocate strategy).

Each cache word is supplemented with a value bit. In a system implementing UVR checking between cache and memory, note that there would be no connection to cache-line valid bits. The ld/st operations remain unvalue-sensitive as before, but save/restore operations transfer the value bit between register and cache without raising an exception. UVR checking, i.e. generating value bits and raising WX exceptions, is done whenever a word is transferred between cache and memory.

Since a WX exception is now unpredictably delayed from the originating st instruction, only the physical write address can be passed to the exception handler. Then, the operating system has to derive the according virtual address or work directly on the physical address. Fortunately, all of the pertinent methods described hereinbelow work on physical addresses as well as virtual addresses.

A description of sensitive and insensitive memory regions will now be given. Data that may be used externally, i.e. that is eventually transferred to/from other machines, should not contain unvalues. First, transferring unvalues to machines that use a different unvalue encoding requires adaption on the fly and, thus, special protocols that exchange unvalue-encoding information, and so forth. Second, unvalues in persistent data require that the unvalue-encoding be stored together with the data when the data is written to a file so that adaption to a potentially different unvalue becomes possible once the file is read after the unvalue-encoding has been changed or if the file is read on a different machine.

The adaption methods described hereinbelow can theoretically solve the aforementioned problems. Nonetheless, that solution is practically impossible: it would require changing virtually all network protocols and file-system interfaces. Fortunately, adapting external data is not a problem. Usually, it simply does not make much sense to have unvalues in files or TCP streams.

Therefore, the following two classes of memory are introduced: sensitive regions, which can hold unvalues; and insensitive regions, which cannot hold unvalues. As a consequence, save/restore operations are valid only on sensitive regions. Typical sensitive regions are program stacks. Insensitive regions contain, for instance, code, file buffers, frame buffers, and TCP/IP buffers.

Application programs can use system calls to classify some of their regions as sensitive. All parts of an address space that are not sensitive are automatically classified as insensitive regions. Of course, other arrangements are possible and readily contemplated by one of ordinary skill in the related art, while maintaining the spirit and scope of the invention.

On sensitive regions, ld, st, save, and restore keep the semantics as defined. On insensitive regions, however, their semantics are as shown in Table 4.

TABLE 4

| | | [m] ≠ UVR | | [m] = UVR |
|---|---|---|---|---|
| ld | r, [m] | r,v_r := [m],1 | | r,v_r := [m],1 |
| restore | r, [m] | undefined | | undefined |
| | | | v_r = 1 | |
| | | r ≠ UVR | r = UVR | v_r = 0 |
| st | r, [m] | [m] := r | [m] := r | WU exception |
| save | r, [m] | undefined | undefined | undefined |

The new ld/st semantics basically require that on insensitive regions the UVR comparison always yields false, or that RU and WX exceptions are ignored. Such semantics can be implemented in hardware, e.g. by per-page unvalue-disable bits in the TLB (see the description below directed to per-page controlled unvalue sensitivity), or in software, e.g. by the operating system kernel ignoring RU and WX traps if the faulting address lies within an insensitive region. If RU/WU are faults, then they must either be reported such that the operating system can either emulate the according ld/st or they must be reported precisely and the hardware must be permitted to restart a ld/st instruction so as to ignore RU/WU.

A description of unvalue redefinition by adaption will now be given. The stochastic-unvalue-encoding approach is based on the following fundamental invariant: all memory words with [m]=UVR have lastly been written from a register r with v_r=0, i.e. they hold real unvalues.

Whenever a WX exception occurs, the invariant is violated and the operating system has to reestablish it. Below, various adaption methods are provided for reestablishing the invariant. Basically, the methods parse the memory and change unvalue words to the new encoding. Obviously, RU exceptions should not occur while inspecting the memory for adaption. Therefore, memory inspection is either done with restore instructions or the processor permits disabling UVR checking on ld instructions.

A description of sensitive adaption will now be given. In particular, an adaption method is described for handling WX exceptions on sensitive regions. The current value of the UVR is denoted by x.

Adaption on WX:
1. Select a new random value x' for the new unvalue encoding.
2. Search through all sensitive regions except the currently written word for a word [m] with [m]=x'.

If [m]=x' was found, then repeat step 1; otherwise, proceed to step 3.

3. For all memory words [m] in all sensitive regions except for the currently written word execute: if [m]=x, then [m]:=x'.
4. Set UVR :=x'.

The method is correct if the processor is subword-stable. For subword-unstable processors, the method is insufficient since a memory word [m]=x can be created without the WX being raised. However, subword-unstable systems can be managed by introducing another level of sensitivity as described hereinbelow with respect to probabilistic adaption.

Similar adaptions become necessary whenever new data that is not written by the processor shows up in a sensitive region, for example when an insensitive region is reclassified as sensitive, when a page is newly mapped into a sensitive region, or when a direct memory access (DMA) (e.g., disk, network) writes into a sensitive region. In general, such adaption is required whenever a sensitive region is modified other than that the processor writes data into.

The new-area-adaption method below adapts subsets of sensitive regions (the entire sensitive region is considered as a subset of itself), whenever subsets are modified/created by means other than by the according data being written by the processor. The mentioned subsets are called new subregions.
Sensitive-region Adaption of New Subregion:
1. Check all words of the new subregion to determine whether [m]=x exists. If there is no such word, then no adaption is necessary. If a word with [m]=x is found, then proceed to step 2.
2. Select a new random value x' for the new unvalue encoding.
3. Search through all memory words of all sensitive regions (including the new subregion) for a word [m] with [m]=x'. If [m]=x' was found, then repeat step 2; otherwise, proceed to step 3.
4. For all memory words [m] of all sensitive regions excluding the new subregion execute: if [m]=x, then [m]:=x'.
5. Set UVR :=x'.

Whenever a page that belongs to a sensitive region is swapped out, the operating system also has to store the current value x_old of the UVR such that x_old can be retrieved when the page is swapped in again. When the page is swapped in again and the current UVR value is x, the following swap-in adaption is executed:
Sensitive-region Adaption on Swap-in:
1. If x=x_{old}, then no adaption is necessary; otherwise, proceed to step 2.
2. Apply the sensitive-region-adaption-of-new-subregion method to the swapped-in page.
3. For all memory words [m] of the swapped-in page execute: if [m]=x_{old}, then [m]:=x.

A description will now be given of probabilistic adaption. This approach also works on a subword-unstable system. The approach is based on a finer classification of sensitive memory regions. The fundamental insight is that the three typical applications of unvalues, i.e., detecting uninitialized variables, propagating computational over/underflows, and deferring memory exceptions, have rather different requirements. The latter two need strict unvalue functionality but can be easily restricted to special and small regions, e.g. save areas for registers. In contrast, detecting uninitialized variables does not require strict unvalue functionality. For program testing, it is acceptable if the unvalue sensitivity disappears sometimes (very seldom, e.g. once per 100 years) and the tested program or the tester is notified of this event.

Therefore, we subdivide the sensitive-region class into strictly-sensitive regions and probabilistically-sensitive regions. These two types of regions will now be described.

Strictly-sensitive regions permit safe handling of unvalues, including save and restore operations. They are typically used as save areas for registers, e.g. on the stack. Typically, there are only a small number of such regions per process and those regions tend to be small. Paging such regions requires swap-in adaption, as described below. RU and WU exceptions are signaled to the excepting program. WX exceptions are handled by the operating system. On subword-unstable processors, stb operations must not operate on such regions.

Probabilistically-sensitive regions are typically used for testing programs (e.g., detecting uninitialized variables). All operations except save/restore can be used without restriction. The sensitivity may disappear at random. However, this will occur only infrequently (once within years) and the tested program is informed about this event. For example, the program can continue executing but without checking for uninitialized variables, or the program can be restarted with the new unvalue.

Probabilistically-sensitive regions tend to be large but they are "cheap". For example, special bookkeeping, WX adaption, and swap-in adaption are not required. RU and WU exceptions are signaled to the excepting program. However, the content of such regions is not being modified as a consequence of WX. Instead, such a region loses its sensitivity when one of the following occurs: (1) a WX exception occurs upon accessing the region itself; or (2) accessing an arbitrary strictly-sensitive region.

The probabilistic adaption method for WX exceptions occurring on strictly-sensitive regions and on probabilistically-sensitive regions is as follows:
Strictly-sensitive-region Adaption on #WX:
1. Reclassify all probabilistically-sensitive regions to insensitive and notify the related programs.
2. Select a new random value x' for the new unvalue encoding.
3. Search through all strictly-sensitive regions except the currently written word for a memory word [m] with [m]=x'. If [m]=x' was found, then repeat step 2; otherwise, proceed to step 4.
4. For all memory words [m] of all strictly-sensitive regions except the currently written word execute: if [m]=x, then [m]:=x'.
5. Set UVR :=x'.

Probabilistically-sensitive-region Adaption on #WX:
1. Reclassify the current region to insensitive and notify the related programs.

Similar adaptions become necessary whenever new data that is not written by the processor shows up in a sensitive region. One example is data that is written into memory by direct memory access (DMA), e.g. when a page is read from disk. The same adaption becomes necessary when a page is newly mapped into a sensitive region, because mapping does not include physical transport of data through the processor. In general, the new-area-adaption method adapts subsets of sensitive regions (the entire sensitive region is considered as a subset of itself) when those subsets are modified/created by means other than by the data being written by the processor. The mentioned subsets are called new subregions.
Strictly-sensitive-region Adaption of New Subregion:
1. Check all words of the new subregion to determine whether there exists [m]=x. If there is no such word, then no adaption is necessary. If a word with [m]=x is found, then proceed to step 2.
2. Reclassify all probabilistically-sensitive regions to insensitive and notify the related programs.
3. Select a new random value x' for the new unvalue encoding.
4. Search through all memory words of all strictly-sensitive regions (including the new subregion) for a word [m] with [m]=x'. If [m]=x' was found, then repeat step 3; otherwise, proceed to step 5.
5. For all memory words [m] of all strictly-sensitive regions excluding the new subregion execute: if [m]=x, then [m]:=x'.
6. Set UVR :=x'.

Probabilistically-sensitive-region Adaption of New Subregion:
1. Search through all memory words of the new subregion for a word [m] with [m]=x. If [m]=x is found, then proceed to step 2; otherwise, no adaption is necessary.

2. Reclassify the current region to insensitive and notify the related programs.

Whenever a page that belongs to a strictly-sensitive region is swapped out, the operating system also has to store the current value x_old of the UVR such that x_old can be retrieved when the page is swapped in again. When the page is swapped in again and the current UVR value is x, the following swap-in adaption is executed:

Strictly-sensitive-region Adaption on Swap-in:
 1. If x=x_{old}, then no adaption is necessary; otherwise, proceed to step 2.
 2. Apply the strictly-sensitive-region-adaption-of-new-subregio n method to the swapped-in page.
 3. For all memory words [m] of the swapped-in page execute: if [m]=x_old, then [m]:=x.

A description of unvalue domains according to an illustrative embodiment of the present invention will now be given. Two address spaces are called "unvalue-connected" if they share at least one word that belongs in both address spaces of a sensitive region. The transitive closure with respect to unvalue-connectedness is the unvalue domain.

It is to be appreciated that different unvalue domains can use different unvalue encodings concurrently. For implementing different unvalue domains, the operating system basically reloads the UVR whenever a context switch to an address space occurs that belongs to a different unvalue domain. In particular, a special nil-unvalue domain can use no unvalue encoding, i.e. the UVR mechanism is disabled for all address spaces of this domain.

For multiple unvalue domains, all adaption methods described herein then operate only on the sensitive regions of the current unvalue domain instead of on all sensitive regions of the entire system.

A description of further variants will now be given. It is to be appreciated that most of these variants can be combined with each other. Given the teachings of the present invention provided herein, one of ordinary skill in the related art will contemplate these and other implementations of the variants described herein.

A description of a per-virtual-page UVR will now be given. Thus, instead of one global UVR, an unvalue can be specified per page. Then, unvalues are held in TLB entries instead of in the UV register. We denote the unvalue encodings by UVm, where UVm=UV_m' if m and m' belong to the same page. Table 5 illustrates the semantics of the operations ld, restore, st, and save.

TABLE 5

|  |  | [m] ≠ UV_m | | [m] = UV_m |
|---|---|---|---|---|
| ld | r, [m] | r,v_r := [m],1 | | RU |
| restore | r, [m] | r,v_r := [m],1 | | v_r := 0 |
|  |  |  | v_r = 1 |  |
|  |  | r ≠ UV_m | r = UV_m | v_r = 0 |
| st | r, [m] | [m] := r | WX | WU |
| save | r, [m] | [m] := r | WX | SU |

A description of smaller UVRs (sub-word) will now be given. Typically, the UVR is one word wide, i.e. 64 or 32 bits. If values are written to memory with a rate of 1 GHz, then a WX exception could be expected every 585 years for 64-bit words or every 4 seconds for 32-bit words.

To save hardware resources, the UVR may be smaller than a word. Then, either only a subset of the bits of r or [m] is checked against the UVR or each or some bits of the UVR are checked against multiple bits of r or [m], respectively. For example, a 32-bit UVR could be checked against a 64-bit word by comparing it with UVR + (not UVR<<32).

This technique is particularly interesting for the per-page unvalues. Note that in any case, a UVR or UV_m must have more possible different values than the number of words in the supervised entity (page or entire memory) to guarantee that the adaption methods terminate.

A description of multiple UVRs will now be given. Instead of a single UVR, the processor can have multiple UVRs. Values are then checked against the multiple UVRs. The comparisons are logically ORed, i.e. an RU exception is raised if the value matches at least one of the UVRs.

For example, use UVR_0 for the unvalue used in strictly-sensitive regions and UVR_1 for the unvalue used in probabilistically-sensitive regions. Then, it is no longer necessary to reset all probabilistically-sensitive regions to insensitive if a WX exception occurs on a strictly-sensitive region.

A description of aliases will now be given. Additional alias value registers, AVRs, can be used to reduce the probability of a WX exception dramatically. Similar to the UVR, at boot time, AVR_1 to AVR_k are loaded with different random values and two arrays are initialized: alias[0 . . . k]:=original[1 . . . k] :=nil. Writing and reading words after boot time is handled as follows:

Write a Valid Value x to Memory:
 1. If UVR≠x and there is no AVR_i with AVR_i=x, then store the value x.
 2. If UVR=x and alias [0]=nil, then search for an AVR_j with original [j]=nil to use it as an alias value for the UVR. If the search succeeds, then set alias [0]:=j, original [j]:=0 and proceed to step 6. Otherwise, if the search fails, then stop and report a WX exception.
 3. If UVR=x and alias [0]=j≠nil, then proceed to step 6.
 4. If AVR_i=x and alias [i]=nil, then search for an AVR_J with original [j]=nil to use it as an alias value for AVR_i (i=j can be a good choice).
    If the search succeeds, then set alias [i]:=j, original [j]:=i and proceed to step 6. Otherwise, if the search fails, then stop and report a WX exception.
 5. If AVR_i=x and alias [i]=j≠nil, then proceed to step 6.
 6. Store the value contained in AVR_j.

Write an Invalid Value to Memory:
 1. Store the value contained in UVR.

Read a Value x from Memory:
 1. If UVR≠x and there is no AVR_i with AVR_i=x, then load the valid value x.
 2. If x=UVR, then load an unvalue.
 3. If x=AVR_i and original [i]=0, then load the valid (!) value UVR.
 4. If x AVR_i an d original [i]≠0, then load the valid value AVR_original [i].

The probability that writing n different values into memory hits all k UVRs is:

$$\frac{\binom{2^{64}-k}{n-k}}{\binom{2^{64}}{n}} = \frac{n}{2^{64}} \cdot \frac{n-1}{2^{64}-1} \cdots \frac{n-k+1}{2^{64}-k+1} \approx \left(\frac{n}{2^{64}}\right)^k.$$

Assume that 64-bit values are written with 1 GHz and we have 16 UVRs. The probability that all 16 UVRs are hit within 10 years is then approximately 10^{-29}. If this probability is not sufficiently low, then add more UVRs. For k=20, we calculate a probability of 10^{-36} for 10 years or 10^{-22} for 50 years, respectively.

A description of SU exceptions will now be given. A variant raises an SU exception whenever a save operation saves an unvalue, i.e. v_r=0 for save r, [m].

This variant is based on the assumption that saving unvalues is infrequent and that signaling this event to the operating system enables better handling of WX exceptions. For instance, the operating system can use the exception for bookkeeping about which words or pages potentially hold unvalues.

A description of per-page controlled unvalue sensitivity will now be given. Per virtual page, i.e. in each TLB entry, we have a bit that enables/disables UVR sensitivity. If disabled, the semantics of ld, st, save, and restore are as shown in Table 6.

TABLE 6

| ld | r, [m] | r,v_r := [m],1 |
| restore | r, [m] | undefined |
| st | r, [m] | [m] := r |
| save | r, [m] | undefined |

A description of address-dependent UVRs will now be given. This is a variant of using multiple UVRs. Instead of checking all of the UVRs in parallel, some bits from the physical address are used to select one (or a subset) of the UVRs for checking. Although the bits could also be chosen from the virtual address, using the physical address is mostly preferable. For instance, using physical address bits also enables this method when UVR checking happens between cache and memory.

Although it offers similar benefits, the new variant needs less parallel comparators than the multiple-UVR variant and, when working on physical addresses between cache and memory, is less time critical than having per-page UVRs in the TLB.

When a WX exception occurs, the operating system could use one of the adaption methods of the invention. However, now the adaption can be restricted to those physical (virtual) memory parts that are associated with the same UVR.

Taking the UVR selecting bits from the physical page number part of the address and not from the offset enables the following method for handling WX exceptions:
Switch UVR by Copying the Page on WX:
  1. Search a free physical page frame that is associated with an unvalue x' that does not occur as a valid value in the faulting page frame. If the search succeeds, then proceed to step 2; otherwise, use an adaption method.
  2. Copy the faulting page frame to the found page frame. Note that this copy, based on restore/save operations, automatically translates old unvalues x to new unvalues x'.
  3. Remap all virtual pages that were mapped to the faulting page frame to the new physical page frame.

More detailed descriptions of various aspects of the present invention will now be given with reference to FIGS. 1–6. It is to be appreciated that the various descriptions are presented for illustrative purposes. One of ordinary skill in the related art would contemplate these and various other configurations, implementations, and optimizations of the present invention, while maintaining the spirit and scope thereof.

FIG. 1 is a diagram illustrating a processor/memory system 1001, according to an illustrative embodiment of the present invention. The system 1001 includes a memory/cache 1000, a control unit 1600, an exception unit 1500, a set of registers r 1100, an unvalue register UVR 1200, two comparators 1300, 1301, a switch 1400, AND gates 1740, and inverters 1780.

The control unit 1600 signals the execution of a load instruction by a ld line 1601, a store instruction by an st line 1602, and a save instruction by a sv line 1603. The exception unit 1500 receives WX exceptions 1501, WU exceptions 1502, and RU exceptions 1503 on the corresponding lines.

Each register 1100 in the set of registers r 1100 is augmented with a value bit v 1101 that specifies whether the register r 1100 currently holds a value or an unvalue. It is to be appreciated that the registers on the left side and the right are identical, but are nonetheless separated into two different registers to facilitate a clear understanding of the present invention.

The unvalue register UVR 1200 holds the current unvalue encoding. The two comparators 1300, 1301 compare written/read words with the UVR 1200. Note that one comparator is sufficient, if rd/wr operations are serialized. In this case, 1300 and 1301 can be identical.

The switch 1400 decides whether the data value or the content of the UVR 1200 is written to the memory/cache 1000.

On store and save operations, the encoding held in the unvalue register UVR 1200 is compared with the value of that register 1100 that has to be stored or saved to the memory/cache 1000 by the comparator 1300. If the comparator 1300 detects equality, and the value bit 1101 of the addressed register 1100 is set and, in addition, the st signal 1602 or the sv signal 1603 is set, then a WX exception 1501 is signaled to the exception unit 1500. Furthermore, an WU exception 1502 is signaled to the exception unit 1500, when the value bit v 1101 of the addressed register r 1100 is not set and the st signal 1602 is high. If the value bit v 1101 of the addressed register r 1100 is set, then the switch 1400 lets the contents of the addressed register r 1100 pass so that it can be written to the memory/cache 1000. Otherwise, if the value bit 1101 is not set, then the switch 1400 lets the contents of the unvalue register UVR 1200 pass so that the current unvalue encoding is written to the memory/cache 1000.

On load and restore operations, the comparator 1301 compares the data word loaded from the memory/cache 1000 into the register 1100 with the value of the unvalue register UVR 1200. If the comparator 1301 detects equality, the value bit v 1101 of the addressed register is reset; otherwise, the value bit v 1101 of the addressed register is set. Furthermore, if the comparator 1301 detects equality and the ld signal 1601 is set, an RU exception 1503 is signaled to the exception unit 1500.

Figure 2:
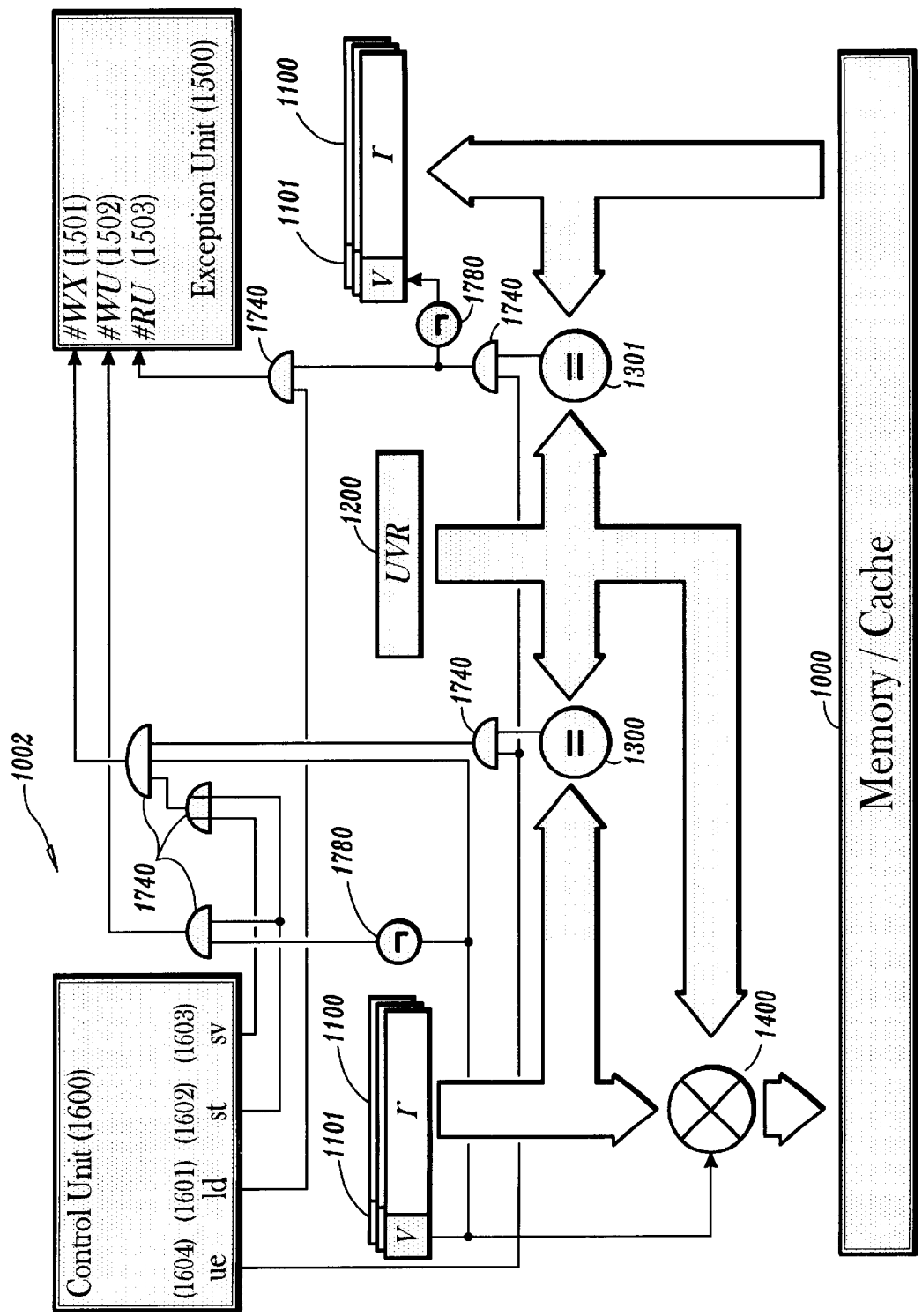
FIG. 2 is a diagram illustrating a processor/memory system 1002, according to another illustrative embodiment of the present invention.

FIG. 2 is a diagram illustrating a processor/memory system 1002, according to another illustrative embodiment of the present invention. In addition to elements and corresponding functions shown and described with respect to FIG. 1, the control unit 1600 supplies an unvalue enable signal ue 1604. The result signal from the comparators 1300,1301 is logically ANDed with the ue signal 1604. That is, if the ue signal 1604 is set, then the mechanism shown in FIG. 2 acts exactly like the mechanism shown in FIG. 1. However, if the ue signal 1604 is not set, then WX exceptions 1501 and RU exceptions 1503 are both masked and cannot occur.

Figure 3:
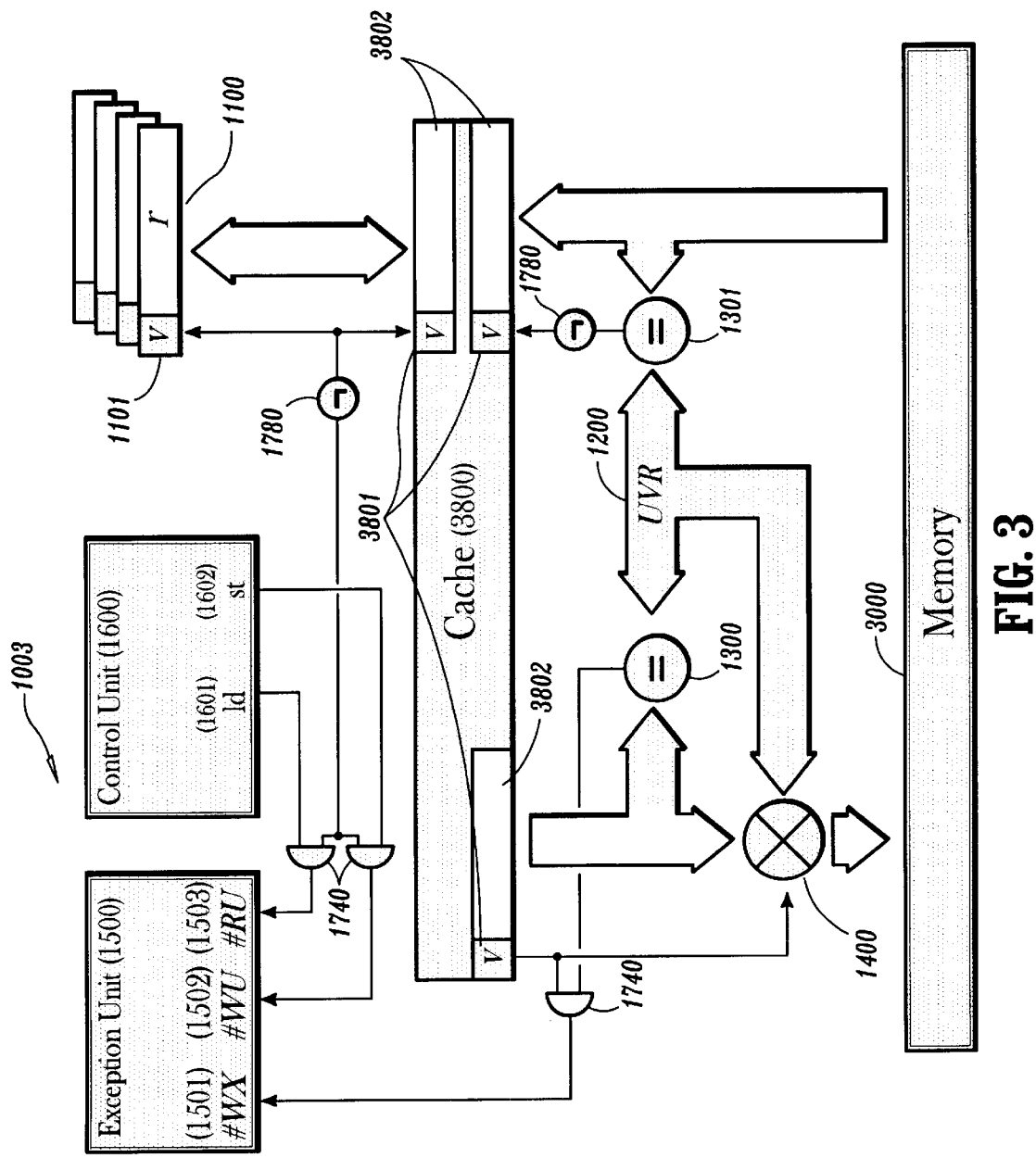
FIG. 3 is a diagram illustrating a processor/memory system 1003, according to yet another illustrative embodiment of the present invention.

FIG. 3 is a diagram illustrating a processor/memory system 1003, according to yet another illustrative embodiment of the present invention. The processor/cache/memory system 1002 includes a control unit 1600, an exception unit 1500, a set of registers r 1100, a cache 3800, an unvalue register UVR 1200, two comparators 1300,1301, a switch 1400, and a memory 3000.

The control unit 1600 signals the execution of a load instruction by a ld line 1601, a store instructions by a st line 1602, and a save instruction by a sv line 1603. The exception unit 1500 receives WX exceptions 1501, WU exceptions 1502, RU exceptions 1503 on the corresponding lines. Each register in the set of registers r 1100 is augmented with a value bit v 1101 that specifies whether the register r 1100 currently holds a value or an unvalue.

The cache 3800 has a value bit v 3801 per cache word 3802. Note that the value bit v is not the same as a cache line's "valid" indicator. The latter indicates whether the cache line is currently valid or not. Our value bits are relevant only for valid lines. Then, the value bits specify on a per word basis whether a word is a value or an unvalue.

The unvalue register UVR 1200 holds the current unvalue encoding. The two comparators 1300,1301 compare written/read words with the UVR 1200. Note that one comparator is sufficient, if rd/wr operations are serialized. In this case, 1300 and 1301 can be identical.

The switch 1400 decides whether the data value or the content of the UVR 1200 is written to the memory 3000.

On save and store operations from a register r 1100 to a cache word 3802 the value bit 1101 of the register is copied into the value bit 3801 of the addressed cache word. If the value bit 1101 is not set and the st signal 1602 is set, then an RU exception 1503 is signaled to the exception unit 1500.

On load and restore operations from a cache word 3802 to a register 1100, the cache word's value bit 3801 is copied to the register's value bit 1101. If the value bit 3801 is not set and the ld signal 1601 is set, then a WU exception 1502 is signaled to the exception unit 1500.

On write operations from the cache 3800 to the memory 3000, the content of the unvalue register UVR 1200 is compared with the value of the cache word 3802 that is written to memory by the comparator 1300. If the comparator 1300 detects equality and the value bit 3801 of the cache word is set, then a WX exception 1501 is signaled to the exception unit 1500. If the value bit v 3801 of the addressed cache word is set, then the switch 1400 lets the content of the addressed cache word 3802 pass so that it can be written to the memory 3000. Otherwise, if the value bit 3801 is not set, then the switch 1400 lets the content of the unvalue register UVR 1200 pass so that the current unvalue encoding is written to the memory 3000.

On read operations from the memory 3000 to the cache 3800, the comparator 1301 compares the data word read with the value of the unvalue register UVR 1200. If the comparator 1301 detects equality, then the value bit v 3801 of the addressed cache word 3802 is reset; otherwise, the value bit v 3801 of the addressed cache word 3802 is set.

Figure 4:
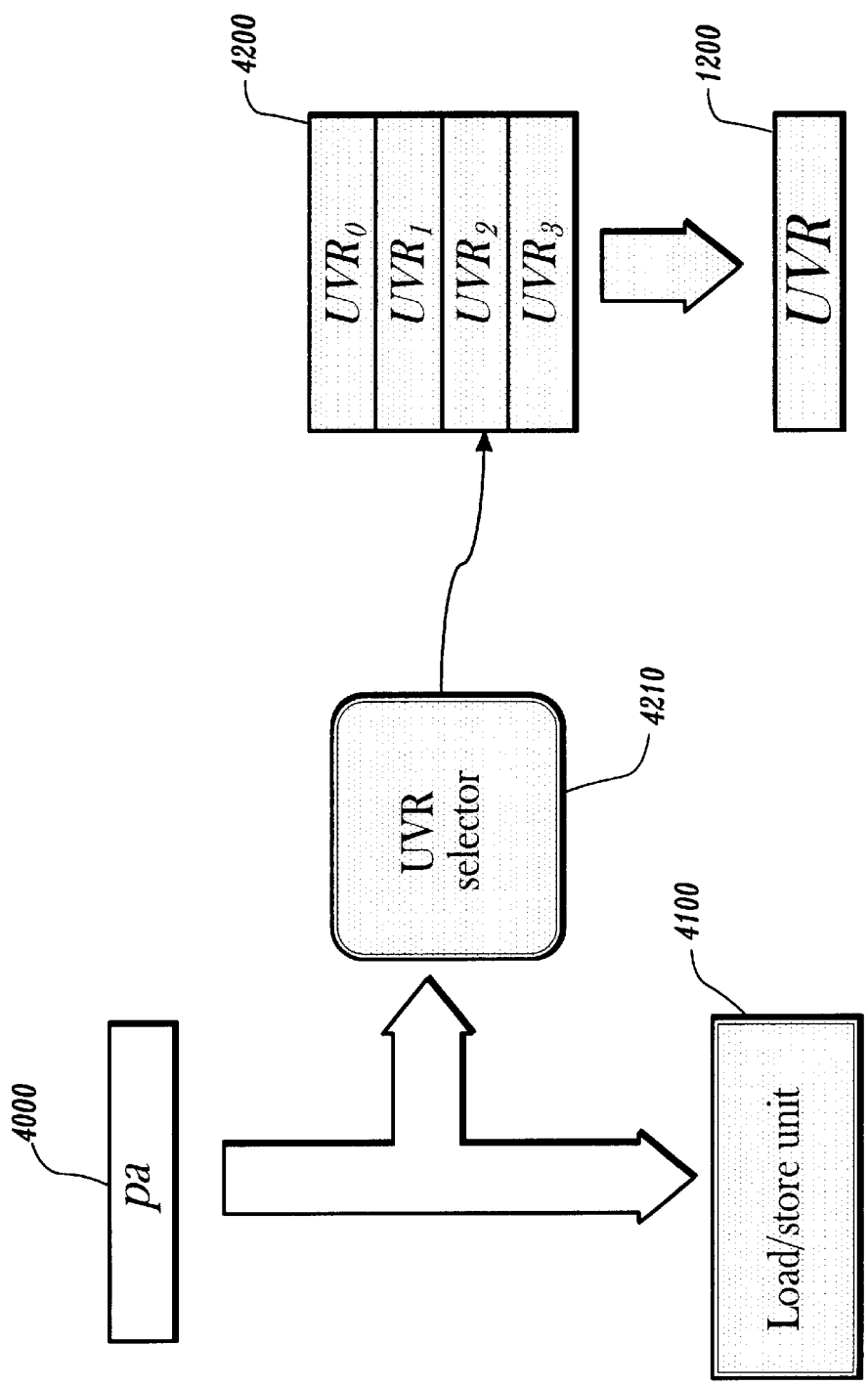
FIG. 4 is a diagram illustrating an apparatus for providing unvalues, according to an illustrative embodiment of the invention.

FIG. 4 is a diagram illustrating an apparatus for providing unvalues, according to an illustrative embodiment of the invention. An unvalue encoding is selected from a variety of unvalue encodings by means of the physical address pa 4000 that is used by the load/store unit 4100. The physical address pa 4000 is sent to a UVR selector 4210 that selects one register out of a set 4200 of unvalue registers UVRi. The selected register is then used as UVR 1200 in FIGS. 1, 2, and 3.

Figure 5:
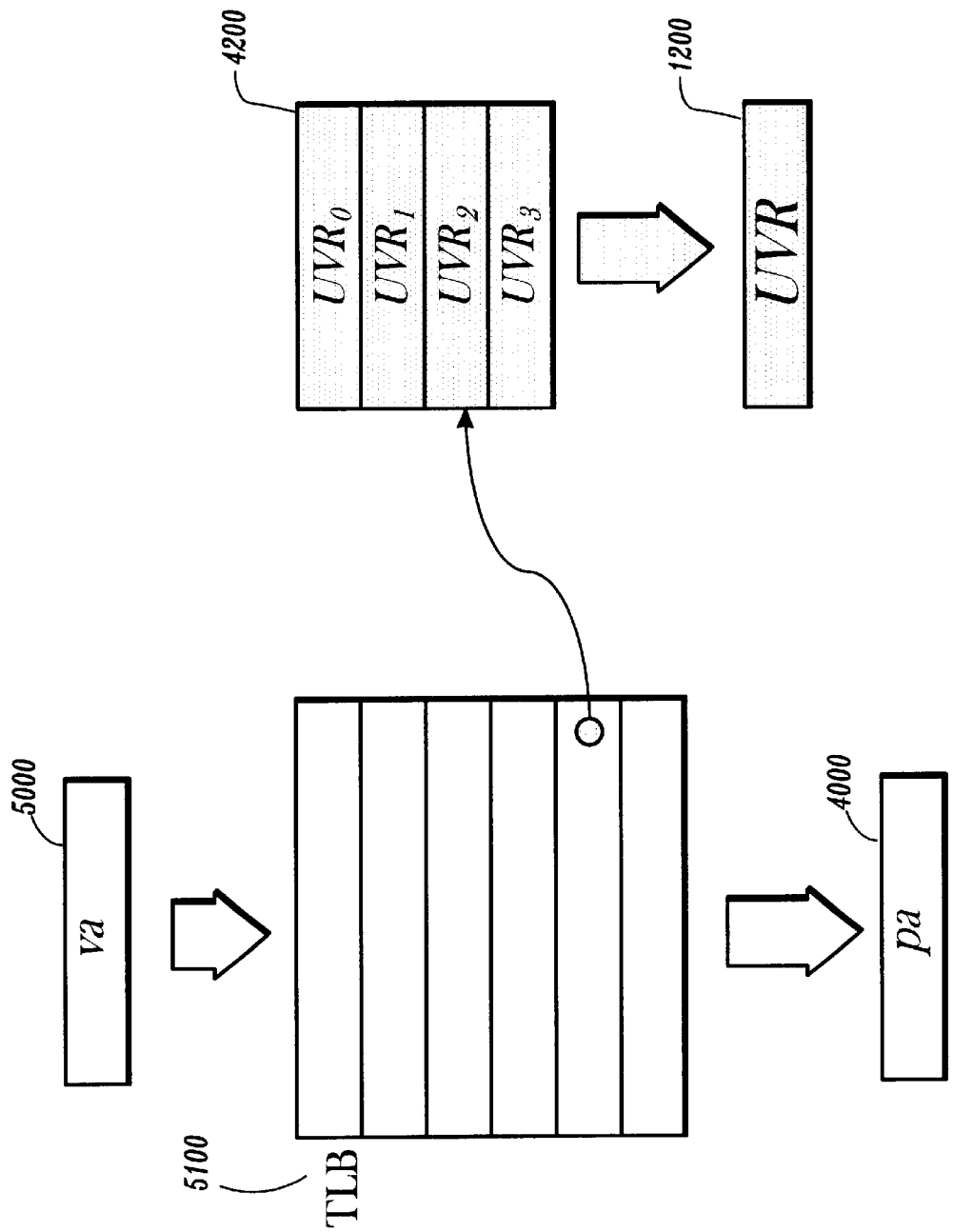
FIG. 5 is a diagram illustrating an apparatus for providing unvalues, according to another illustrative embodiment of the invention.

FIG. 5 is a diagram illustrating an apparatus for providing unvalues, according to another illustrative embodiment of the invention. An unvalue encoding is selected from a variety of unvalue encodings by means of the virtual address va 5000 that is translated by the TLB 5100. Upon a TLB hit, the TLB delivers a physical address pa 4000 and a link 5101 that selects one register out of a set 4200 of unvalue registers UVRi. The selected register is then used as UVR 1200 in FIGS. 1, 2, and 3.

Figure 6:
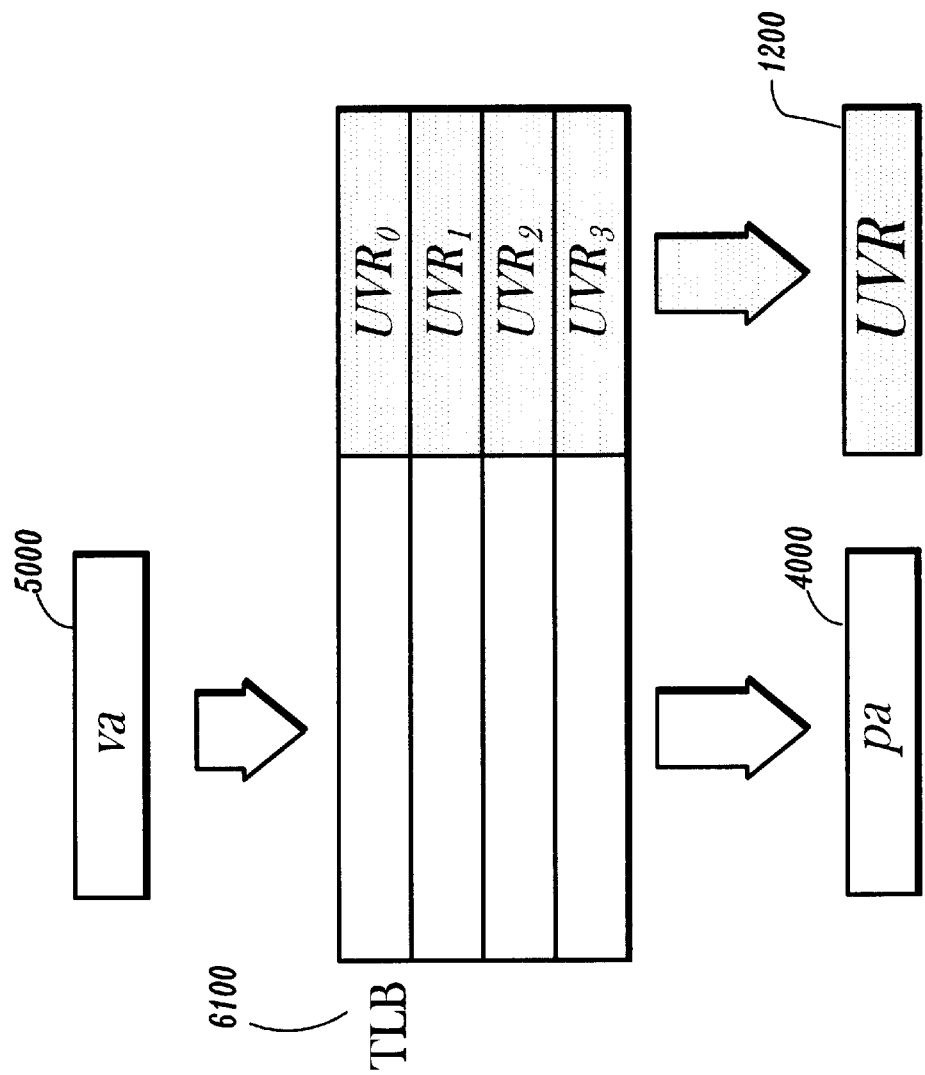
FIG. 6 is a diagram illustrating an apparatus for providing unvalues, according to yet another illustrative embodiment of the invention.

FIG. 6 is a diagram illustrating an apparatus for providing unvalues, according to yet another illustrative embodiment of the invention. An unvalue encoding is selected from a variety of unvalue encodings by means of the virtual address va 5000 that is translated by the TLB 6100. Besides, e.g., the physical address, each TLB entry also contains an unvalue encoding UVRi. Upon a TLB hit, the TLB delivers a physical address pa 4000 and an unvalue encoding that is then used as UVR 1200 in FIGS. 1, 2, and 3.

FIG. 7 is a flow chart illustrating a method for representing unvalues in an unvalue-unaware memory of a computer processing system, according to an illustrative embodiment of the invention. Arbitrary bit combinations are selected to represent the unvalues, upon startup of the system (step 2). Upon performing a read operation from the memory, a read value is interpreted as an unvalue, when the read value matches at least one of the bit combinations (step 4). Upon performing a write operation to the memory, a value-unvalue-collision exception is raised, when a valid value is written to the memory and the valid value matches at least one of the bit combinations (step 6).

FIG. 8 is a flow chart further illustrating step 2 of FIG. 7, according to an illustrative embodiment of the invention. A plurality of unvalue encodings are generated (step 12). The unvalue encodings may be pseudo-random or random numbers. The unvalue encodings may be word-wide or less than word-wide.

Some bits from a virtual or a physical address corresponding to the read or the write operation are extracted (step 14). A current unvalue encoding is selected, based upon the extracted bits (step 16).

FIG. 9 is a flow chart illustrating an optimization of the method of FIG. 7 with respect to a translation lookaside buffer, according to an illustrative embodiment of the present invention. A TLB entry is allowed to selectively enable or disable unvalue checking on a virtual page that is specified by the TLB entry (step 22). A word value corresponding to the read or the write operation is mandated as never matching any of the unvalue encodings, when the TLB entry disables unvalue checking (step 24).

FIG. 10 is a flow chart illustrating the selection of an unvalue, according to an illustrative embodiment of the invention. At least a subset of the unvalue encodings are held in unvalue registers in a translation lookaside buffer (TLB) (step 32). One of the unvalue registers is selected as a current unvalue register, based upon a virtual or a physical address corresponding to the read or the write operation (step 34).

FIG. 11 is a flow chart illustrating the selection of an unvalue, according to another illustrative embodiment of the invention. The current unvalue encoding is held in an unvalue register located in an interface between an unvalue-unaware cache and an unvalue-unaware next-level memory (step 42). The cache is able to distinguish between unvalues and valid values. The next-level memory is unable to distinguish between unvalues and valid values.

One of the unvalue registers is selected as a current unvalue register, based upon a physical address of the read or write operation (step 44).

FIG. 12 is a flow chart illustrating the selection of an unvalue, according to yet another illustrative embodiment of the invention. The unvalue encodings are held in unvalue registers (step 52). The unvalue registers are supplemented with an unvalue-domain register (step 54). One of the unvalue registers is selected as a current unvalue register, based upon a value stored in the unvalue-domain register and a portion of the physical address corresponding to the read or write operation (step 56).

FIG. 13 is a flow chart illustrating exception strategies for processor instructions, according to an illustrative embodiment of the invention. At least one processor instruction is enabled to read and/or write unvalues from and to the memory, respectively, without raising an exception (step 62). Alternatively, at least one processor instruction is enabled to raise an exception when the instruction attempts to read and/or write an unvalue from and to the memory, respectively (step 64). It is to be appreciated that the specification of instruction semantics does not occur dynamically and, thus, either step 62 or step 64 is supported by the design of a computer instruction set but not both.

FIG. 14 is a flow chart illustrating various optimizations of the method of FIG. 7, according to another illustrative embodiment of the invention. The current unvalue encoding is held in an unvalue register (step 72). The unvalue register is permitted to be selectively enabled and disabled (step 74). A value corresponding to the read or write operation is mandated as never matching the unvalue register, when the unvalue register is disabled (step 76). Moreover, only privileged software is permitted to read and/or write from and to the unvalue register, respectively (step 78).

FIG. 15 is a flow chart further illustrating step 4 of FIG. 7, according to an illustrative embodiment of the invention. The read value is compared with a current unvalue encoding (step 82). The read value is classified as an unvalue, when the read value matches the current unvalue encoding (step 84). The read value is classified as a valid value, when the read value does not match the current unvalue encoding (step 86).

Figure 16:
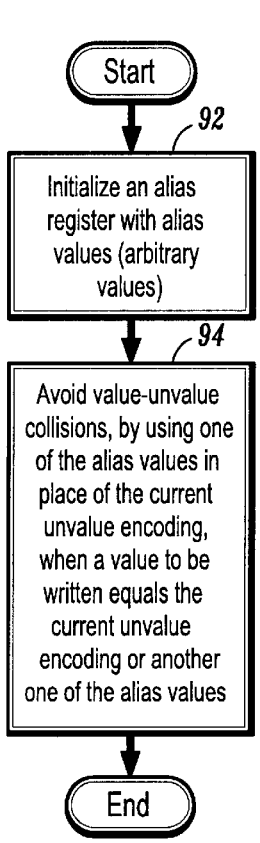
FIG. 16 is a flow chart illustrating an optimization of the method of FIG. 7, according to yet another illustrative embodiment of the invention.

FIG. 16 is a flow chart illustrating an optimization of the method of FIG. 7, according to yet another illustrative embodiment of the invention. An alias register is initialized with alias values (arbitrary values, such as unvalues) (step 92). Value-unvalue collisions are avoided, by using one of the alias values in place of the current unvalue encoding, when a value to be written equals the current unvalue encoding or another one of the alias values (step 94).

Figure 17:
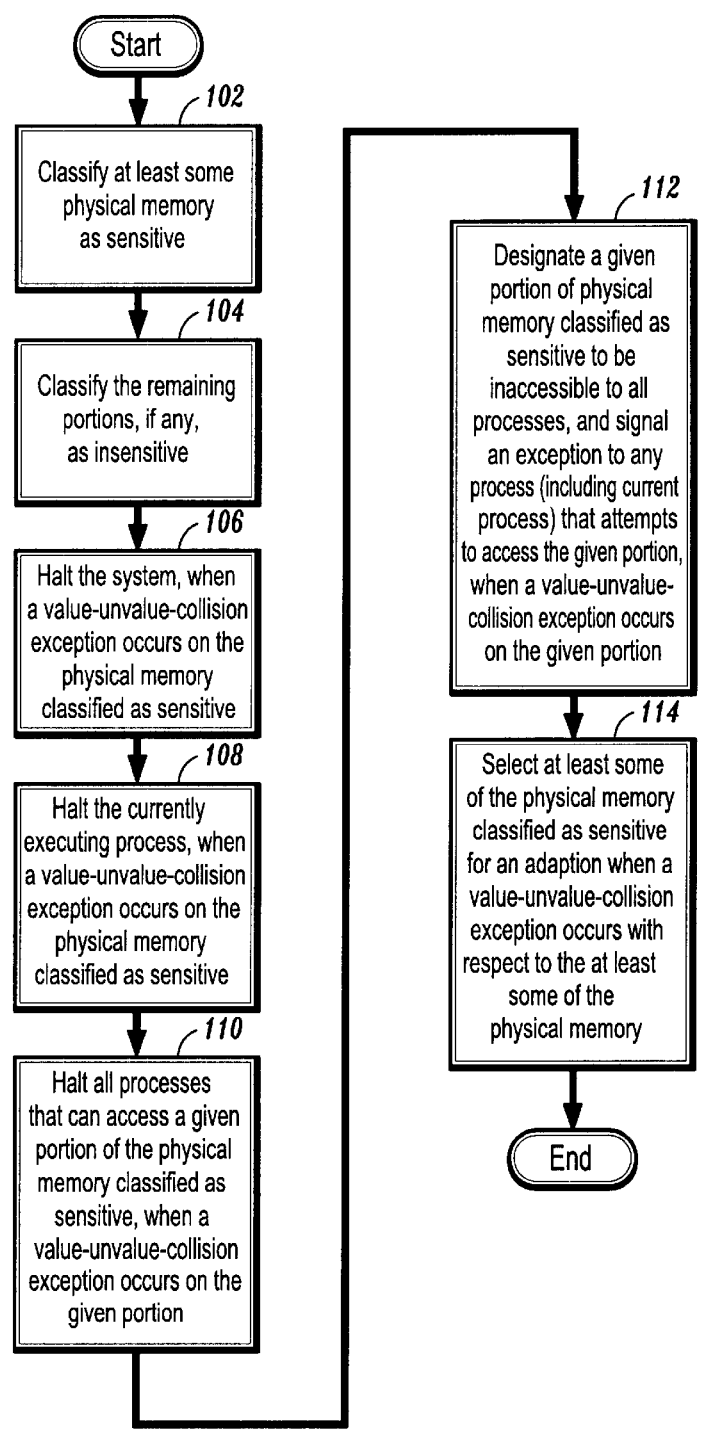
FIG. 17 is a flow chart illustrating various optimizations of the method of FIG. 7, according to yet still another illustrative embodiment of the invention.

FIG. 17 is a flow chart illustrating various optimizations of the method of FIG. 7, according to yet still another illustrative embodiment of the invention. At least some of the physical memory is classified as sensitive (step 102). The remaining portions, if any, are classified as insensitive (step 104). The system is halted, when a value-unvalue-collision exception occurs on the physical memory classified as sensitive (step 106). The currently executing process is halted, when a value-unvalue-collision exception occurs on the physical memory classified as sensitive (step 108). All processes than can access a given portion of the physical memory classified as sensitive are halted, when a value-unvalue-collision exception occurs on the given portion (step 110). A given portion of the physical memory classified as sensitive is designated to be inaccessible to all processes, and an exception is signaled to any process (including the current process) that attempts to access the given portion, when a value-unvalue-collision exception occurs on the given portion (step 112). At least some of the physical memory classified as sensitive is selected for an adaption, when a value-unvalue-collision occurs with respect to the at least some of the physical memory (step 114).

Figure 18:
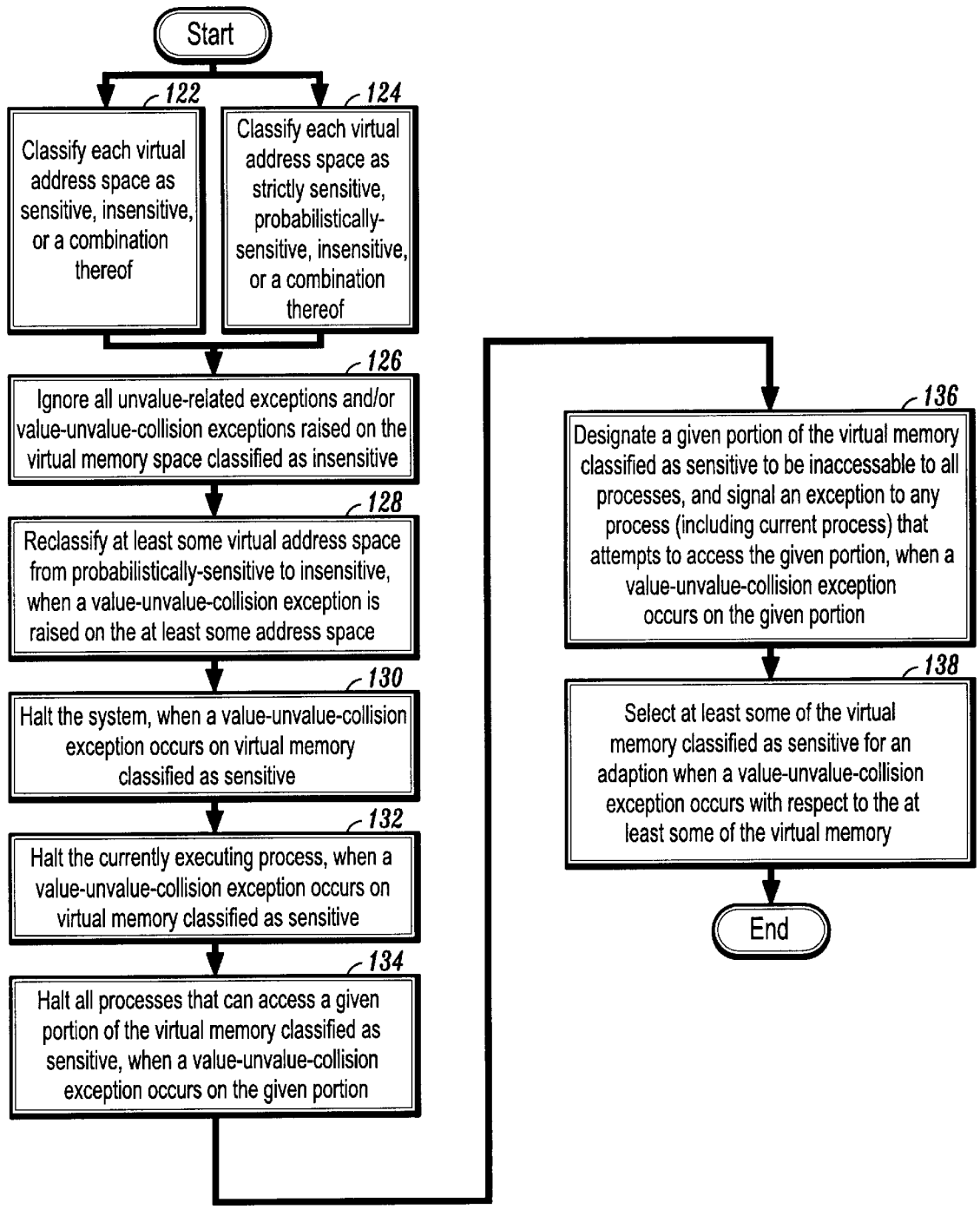
FIG. 18 is a flow chart illustrating various optimizations of the method of FIG. 7, according to a further illustrative embodiment of the invention.

FIG. 18 is a flow chart illustrating various optimizations of the method of FIG. 7, according to a further illustrative embodiment of the invention. Each virtual address space is classified as sensitive, insensitive, or a combination thereof (step 122). Alternatively, each virtual address space is classified as strictly sensitive, probabilistically-sensitive, insensitive, or a combination thereof (step 124). For the succeeding steps, any reference to a memory area classified as sensitive includes both strictly sensitive and probabilistically-sensitive memory unless otherwise noted (i.e., unless strictly sensitive and/or probabilistically-sensitive memory is specifically referenced.

All unvalue-related exceptions and/or value-unvalue-collision exceptions raised on the virtual memory space classified as insensitive are ignored (step 126). At least some virtual address space are reclassified from probabilistically-sensitive to insensitive, when a value-unvalue-collision exception is raised on the at least some address space (step 128). The system is halted, when a value-unvalue-collision exception occurs on virtual memory classified as sensitive (step 130). The currently executing process is halted, when a value-unvalue-collision exception occurs on virtual memory classified as sensitive (step 132). All processes than can access a given portion of the virtual memory classified as sensitive are halted, when a value-unvalue-collision exception occurs on the given portion (step 134). A given portion of the virtual memory classified as sensitive is designated to be inaccessible to all processes, and an exception is signaled to any process (including the current process) that attempts to access the given portion, when a value-unvalue-collision exception occurs on the given portion (step 136). At least some of the virtual memory classified as sensitive is selected for an adaption, when a value-unvalue-collision occurs with respect to the at least some of the virtual memory (step 138).

Although the illustrative embodiments have been described herein with reference to the accompanying drawings, it is to be understood that the present invention and method are not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for representing unvalues in an unvalue-unaware memory of a computer processing system, said method comprising the steps of:

selecting arbitrary bit combinations to represent the unvalues, upon startup of the system;

upon performing a read operation from the memory, interpreting a read value as an unvalue, when the read value matches at least one of the bit combinations; and upon performing a write operation to the memory, raising a value-unvalue-collision exception, when a valid value is written to the memory and the valid value matches at least one of the bit combinations.

2. The method according to claim 1, wherein said selecting step further comprises the step of generating a plurality of unvalue encodings, and said method further comprises the step of, for either one of the read operation and the write operation, selecting one of the plurality of unvalue encodings as a current unvalue encoding.

3. The method according to claim 1, further comprising the step of enabling at least one processor instruction to at least one of read and write the unvalues from and to the memory, respectively, without raising a corresponding exception.

4. The method according to claim 1, further comprising the step of enabling at least one processor instruction to raise an exception when the at least one processor instruction attempts to at least one of read and write a given unvalue from and to the memory, respectively.

5. The method according to claim 1, wherein said raising step further comprises the steps of:
   comparing the valid value with a current unvalue encoding; and
   raising the value-unvalue-collision exception when the valid value matches the current unvalue encoding.

6. The method according to claim 1, further comprising the steps of:
   classifying at least some of a physical memory of the system as sensitive; and
   classifying remaining portions of the physical memory, if any, as insensitive.

7. The method according to claim 6, further comprising the step of halting the system, when a value-unvalue-collision exception occurs on the physical memory that is classified as sensitive.

8. The method according to claim 6, further comprising the step of halting a currently executing process, when a value-unvalue-collision exception occurs on the physical memory that is classified as sensitive.

9. The method according to claim 6, further comprising the step of halting all processes that can access a given portion of the physical memory classified as sensitive, when a value-unvalue-collision exception occurs on the given portion of the physical memory.

10. The method according to claim 6, further comprising the step of designating a given portion of the physical memory that is classified as sensitive to be inaccessible to all processes and signaling an exception to any process including a current process that attempts to access the given portion of the physical memory, when a value-unvalue-collision exception occurs on the given portion of the physical memory.

11. The method according to claim 6, further comprising the step of selecting at least some of the physical memory classified as sensitive for an adaption when a value-unvalue-collision exception occurs with respect to the at least some of the physical memory, the adaption comprising the steps of:
   selecting a new unvalue encoding;
   determining whether a match exists between the at least some of the physical memory and the new unvalue encoding;
   returning to said step of selecting the new unvalue encoding, when the match exists;
   replacing each word in the at least some of the physical memory that matches a previous unvalue encoding by a word that matches the new unvalue encoding.

12. The method according to claim 1, further comprising the step of classifying each virtual address space of the system as one of sensitive, insensitive, or a combination thereof.

13. The method according to claim 1, further comprising the step of classifying each virtual address space of the system as one of strictly sensitive, probabilistically-sensitive, insensitive, and any combination thereof.

14. The method according to claim 13, further comprising the step of ignoring all unvalue-related exceptions raised on the virtual memory space that is classified as insensitive.

15. The method according to claim 13, further comprising the step of ignoring value-unvalue-collision exceptions raised on the virtual memory that is classified as insensitive.

16. The method according to claim 13, further comprising the step of reclassifying at least some of the virtual address space from probabilistically-sensitive to insensitive, when a value-unvalue-collision exception is raised on the at least some of the address space.

17. The method according to claim 13, further comprising the step of halting the system, when a value-unvalue-collision exception occurs on the virtual memory that is classified as sensitive.

18. The method according to claim 13, further comprising the step of halting a currently executing process, when a value-unvalue-collision exception occurs on the virtual memory that is classified as sensitive.

19. The method according to claim 13, further comprising the step of halting all processes that can access a given portion of the virtual memory classified as sensitive, when a value-unvalue-collision exception occurs on the given portion of the virtual memory.

20. The method according to claim 13, further comprising the step of designating a given portion of the virtual memory that is classified as sensitive to be inaccessible to all processes and signaling an exception to any process including a current process that attempts to access the given portion of the virtual memory, when a value-unvalue-collision exception occurs on the given portion of the virtual memory.

21. The method according to claim 13, further comprising the step of selecting at least some of the virtual memory classified as sensitive for an adaption when a value-unvalue-collision exception occurs with respect to the at least some of the virtual memory, the adaption comprising the steps of:
   selecting a new unvalue encoding;
   determining whether a match exists between the at least some of the virtual memory and the new unvalue encoding;
   returning to said step of selecting the new unvalue encoding, when the match exists;
   replacing each word in the at least some of the virtual memory that matches a previous unvalue encoding by a word that matches the new unvalue encoding.

22. The method according to claim 1, wherein virtual and physical classifications of the memory can coexist, but for a given mapped page, a virtual and a physical classification are identical.

23. The method according to claim 1, wherein virtual and physical classifications can coexist, and a resulting classification of a given word is determined based upon a physical and a virtual classification of the given word.

24. The method according to claim 1, wherein said interpreting and raising steps comprise the step of comparing values read from and written to the memory with the arbitrary bit combinations.

25. The method according to claim 1, wherein said method is implemented by a program storage device readable by machine, tangibly embodying a program of instructions executable by the machine to perform said method steps.

26. The method according to claim 2, wherein said step of selecting the current unvalue encoding for the read operation comprises the steps of:
- extracting some bits from one of a virtual address and a physical address corresponding to the read operation; and
- selecting the current unvalue encoding, based on the extracted bits.

27. The method according to claim 2, wherein said step of selecting the current unvalue encoding for the write operation comprises the steps of:
- extracting some bits from one of a virtual address and a physical address corresponding to the write operation; and
- selecting the current unvalue encoding, based on the extracted bits.

28. The method according to claim 2, wherein the plurality of unvalue encodings are one of pseudo-random numbers and random numbers.

29. The method according to claim 2, wherein each of the plurality of unvalue encodings are word-wide, and the method further comprises the step of classifying a word value as matching the current unvalue encoding, when the word value is equal to the current unvalue encoding, the word value being one of read and to be written.

30. The method according to claim 2, wherein each of the plurality of unvalue encodings comprise less bits than a predetermined word-size of the memory, and the method further comprises the step of classifying a word value as matching the current unvalue encoding, when a Boolean function applied to the word value and the current unvalue encoding evaluates to true, the word value being one of read and to be written.

31. The method according to claim 30, wherein the function evaluates to true for a single word value, when the function is applied to any of the plurality of unvalue encodings evaluates.

32. The method according to claim 30, wherein the function evaluates to true for a plurality of word values, when the function is applied to any of the plurality of unvalue encodings.

33. The method according to claim 2, further comprising the step of allowing a given TLB entry in a translation lookaside buffer (TLB) of the computer processing system to selectively enable or disable unvalue checking on a virtual page that is specified by the given TLB entry, and wherein a word value corresponding to one of the read operation and the write operation never matches any of the plurality of unvalue encodings when the given TLB entry disables the unvalue checking.

34. The method according to claim 2, further comprising the step of holding the current unvalue encoding in an unvalue register of a processor of the computer processing system.

35. The method according to claim 34, further comprising the step of permitting the unvalue register to be selectively enabled and disabled, and wherein a value corresponding to one of the read operation and the write operation never matches the unvalue register when the unvalue register is disabled.

36. The method according to claim 34, further comprising the step of permitting only privileged software to at least one of read from and write to the unvalue register.

37. The method according to claim 34, further comprising the steps of:
- initializing at least one alias register with alias values, the alias values being arbitrary values, the at least one alias register supplementing the unvalue register; and
- avoiding value-unvalue collisions, by using one of the alias values in place of the current unvalue encoding, when a value to be written to the memory equals the current unvalue encoding or another one of the alias values.

38. The method according to claim 2, further comprising the steps of:
- holding at least a subset of the plurality of unvalue encodings in unvalue registers comprised in a translation lookaside buffer (TLB) of the computer processing system; and
- selecting one of the plurality of unvalue registers as a current unvalue register, based on a virtual address corresponding to one of the read operation and the write operation.

39. The method according to claim 38, further comprising the step of permitting a given unvalue register of the plurality of unvalue registers to be selectively enabled and disabled, and wherein a value corresponding to one of the read operation and the write operation never matches the given unvalue register, when the given unvalue register is disabled.

40. The method according to claim 2, further comprising the steps of:
- holding at least a subset of the plurality of unvalue encodings in a plurality of unvalue registers comprised in a processor of the system; and
- selecting one of the plurality of unvalue registers as a current unvalue register, based on a physical address corresponding to one of the read operation and the write operation.

41. The method according to claim 2, further comprising the step of holding the current unvalue encoding in an unvalue register located in an interface between an unvalue-aware cache and an unvalue-unaware next-level memory, the cache having hardware means adapted to differentiate between the unvalues and valid values, the next-level memory having an absence of the hardware means.

42. The method according to claim 41, further comprising the steps of:
- holding the plurality of unvalue encodings in a plurality of unvalue registers located in an interface between an unvalue-aware cache and an unvalue-unaware next-level memory, the cache having hardware means adapted to differentiate between the unvalues and valid values, the next-level memory having an absence of the hardware means; and
- selecting one of the plurality of unvalue registers as the current unvalue register, based on a physical address corresponding to one of the read operation and the write operation.

43. The method according to claim 2, further comprising the steps of:
- holding the plurality of unvalue encodings in a plurality of unvalue registers;
- supplementing the plurality of unvalue registers with an unvalue-domain register; and
- selecting a current unvalue register from the plurality of unvalue registers, based on at least one of a value stored in the unvalue-domain register and a portion of a physical address, the physical address corresponding to one of the read operation and the write operation.

44. The method according to claim 43, wherein the plurality of unvalue registers and the unvalue-domain register are located in at least one of a processor and an interface of the system, the interface being disposed between an unvalue-aware cache and an unvalue-unaware next-level memory, the cache having hardware means adapted to differentiate between the unvalues and valid values, the next-level memory having an absence of the hardware means.

45. The method according to claim 43, further comprising the step of permitting only privileged software to write to the unvalue-domain register.

46. The method according to claim 2, wherein said interpreting step comprises the steps of:

comparing the read value with a current unvalue encoding;

classifying the read value as an unvalue, when the read value matches the current unvalue encoding; and classifying the read value as a valid value, when the read value does not match the current unvalue encoding.

47. The method according to claim 2, further comprising the step of writing the current unvalue encoding to the memory, upon writing an unvalue to the memory.

48. The method according to claim 2, further comprising the step of writing a value that matches the current unvalue encoding to the memory, upon writing an unvalue to the memory.

49. A method for representing unvalues in an unvalue-unaware memory of a computer processing system, comprising the steps of:

generating a plurality of unvalue encodings to represent the unvalues, each unvalue encoding comprising an arbitrary bit combination;

for each read operation from the memory, interpreting a read value as an unvalue, when the read value matches at least one of the plurality of unvalue encodings; and for each write operation to the memory, raising a value-unvalue-collision exception, when a valid value is written to the memory that matches at least one of the plurality of unvalue encodings.

\* \* \* \* \*